(12) United States Patent
Sedlacek et al.

(10) Patent No.: US 10,098,061 B2
(45) Date of Patent: Oct. 9, 2018

(54) WLAN NETWORK SELECTION (71) Applicant: Telefonaktiebolaget LM Ericsson (publ), Stockholm (SE)

(72) Inventors: Ivo Sedlacek, Hovorcovice (CZ); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/900,540

(22) PCT Filed: Jun. 27, 2014

(86) PCT No.: PCT/EP2014/063755
§ 371 (c)(1),
(2) Date: Dec. 21, 2015

(87) PCT Pub. No.: WO2014/207230
PCT Pub. Date: Dec. 31, 2014

(65) Prior Publication Data
US 2016/0165530 A1    Jun. 9, 2016

Related U.S. Application Data (60) Provisional application No. 61/840,041, filed on Jun. 27, 2013.

(51) Int. Cl.
*H04W 48/18* (2009.01)
*H04W 48/16* (2009.01)
*H04W 84/12* (2009.01)

(52) U.S. Cl.
CPC .......... *H04W 48/18* (2013.01); *H04W 48/16* (2013.01); *H04W 84/12* (2013.01)

(58) Field of Classification Search
CPC ...... H04W 48/16; H04W 48/18; H04W 84/12
See application file for complete search history.

(56) References Cited

U.S. PATENT DOCUMENTS

| | | | |
|---|---|---|---|
| 6,073,013 A | 6/2000 | Agre et al. | |
| 2006/0094427 A1 | 5/2006 | Buckley et al. | |
| 2009/0286531 A1 | 11/2009 | Bhatt et al. | |
| 2013/0070644 A1 | 3/2013 | McCann et al. | |

(Continued)

FOREIGN PATENT DOCUMENTS

| | | |
|---|---|---|
| RU | 2481749 C2 | 5/2013 |
| WO | WO 2007/004938 A1 | 1/2007 |
| WO | WO 2012/066384 A1 | 5/2012 |

OTHER PUBLICATIONS

3GPP TS 33.106 v12.0.0 (Mar. 2013).*

(Continued)

*Primary Examiner* — Jae Y Lee
(74) *Attorney, Agent, or Firm* — Sage Patent Group (57) ABSTRACT The invention relates to a method and devices for selecting a communication network for a mobile terminal accessing the communication network via an unlicensed wireless access network. Therein, the communication network is selected by a mobile terminal to fulfill carrier grade requirements, which can include lawful interception capabilities. An access node for an unlicensed wireless access network is configured to provide a list of communication networks that fulfill carrier grade requirements.

26 Claims, 5 Drawing Sheets

(56) References Cited

U.S. PATENT DOCUMENTS

| | | | |
|---|---|---|---|
| 2014/0101726 A1* | 4/2014 | Gupta | H04N 21/2365 726/4 |
| 2015/0189547 A1* | 7/2015 | Forssell | H04L 63/101 370/235 |
| 2016/0374013 A1* | 12/2016 | Drevon | H04W 24/02 |

OTHER PUBLICATIONS

3GPP TS 33.107 v12.2.0 (Mar. 2013).*

3GPP, Technical Specification, "3rd Generation Partnership Project; Technical Specification Group Services and System Aspects; IP Multimedia Core Network Subsystem (IMS) Multimedia Telephony Service and supplementary services; Stage 1 (Release 12)", 3GPP TS 22.173 V12.3.0 (Dec. 2012), 72 pp.

3GPP, Technical Specification, "3rd Generation Partnership Project; Technical Specification Group Core Network and Terminals; Numbering, addressing and identification (Release 11)", 3GPP TS 23.003 V11.5.0 (Mar. 2013), 83 pp.

3GPP, Technical Specification, "3rd Generation Partnership Project; Technical Specification Group Services and System Aspects; 3G security; Lawful Interception requirements (Release 12)", 3GPP TS 33.106 V12.0.0 (Mar. 2013), 17 pp.

3GPP, Technical Specification, "3rd Generation Partnership Project; Technical Specification Group Services and System Aspects; 3G security; Lawful interception architecture and functions (Release 12)", 3GPP TS 33.107 V12.2.0 (Mar. 2013), 147 pp.

International Search Report and Written Opinion of the International Searching Authority, Application No. PCT/EP2014/063755, dated Oct. 31, 2014.

3GPP, Technical Specification, "3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)", 3GPP TS 24.234 V11.3.0 (Jun. 2012), 41 pp.

IEEE Computer Society, "IEEE Standard for Information Technology—Telecommunications and Information exchange between systems—Local and metropolitan area networks Specific Requirements—Part 11: Wireless LAN Medium Access Control (MAC) and Physical Layer (PHY) specifications: Amendment 9: Interworking with External Networks", IEEE Standard 802.11u™—2011 (Amendment of IEEE Std 802.11™—2007, Feb. 25, 2011, 208 pp.

Communication pursuant to Article 94(3) EPC for European Patent Application No. 14 734 460.0 dated Mar. 21, 2017.

English translation of the Official Action for Russian Patent Application No. 201610232/07(003334) dated Jan. 10, 2018.

* cited by examiner

WLAN NETWORK SELECTION

CROSS REFERENCE TO RELATED APPLICATIONS

This application is a 35 U.S.C. § 371 national stage application of PCT International Application No. PCT/EP2014/063755, filed on Jun. 27, 2014, which itself claims priority to U.S. provisional Application No. 61/840,041, filed Jun. 27, 2013, the disclosure and content of both of which are incorporated by reference herein in their entireties. The above-referenced PCT International Application was published in the English language as International Publication No. WO 2014/207230 A1 on Dec. 31, 2014.

TECHNICAL FIELD

The present invention relates to a method and devices for selecting a communication network for a mobile terminal accessing the communication network via an unlicensed wireless access network.

BACKGROUND

In mobile telecommunication systems, wireless or radio access networks, RAN, provide radio based access for mobile terminals to a communication network. Therein, frequency resources are provided for radio communication between a mobile terminal and the access network, which then relays the communication to the communication network the mobile terminal wishes to access, and/or which is associated with the RAN.

These frequency resources may be licensed, i.e. certain frequency resources may be exclusively used by a certain network operator, or unlicensed, i.e. certain frequency resources may be used freely by anyone. An example for licensed frequency resources are those used by mobile communication networks, specifically radio access networks, according to 3GPP standards, e.g. GSM, UMTS/(W)CDMA, or LTE.

An example for unlicensed frequency resources are those used by wireless networks according to IEEE 802.11 standards, also denoted WiFi or WLAN, or according to the Bluetooth standard.

One example for communication networks as mentioned above are Public Land Mobile Networks (PLMN), i.e. networks that are established and operated by an administration or by a recognized operating agency (ROA), also called network operator, for the specific purpose of providing land mobile telecommunications services to the public.

PLMNs usually provide defined and reliable services and capabilities, so-called carrier-grade features. One such carrier-grade feature is the capability for lawful interception in the country where the mobile terminal is accessing the network. This is e.g. guaranteed for circuit-switched (CS) voice calls according to the 3GPP standards as defined in 3GPP TS 33.106 V12.0.0 and TS 33.107 V12.2.0.

A further service that may be offered by a PLMN is the IMS (IP Multimedia Subsystem) telephony service, as for example defined in 3GPP TS 22.173 V12.3.0. In order to be rated as carrier-grade, this service would have to offer telephony features comparable to those of CS voice call services.

PLMNs are usually accessed by radio access networks according to the 3GPP standards as mentioned above. However, today an increasing demand for alternative mobile accesses occurs, such that for example WLAN access to 3GPP networks is provided. This is for example defined in the 3GPP TS 24.234 V11.3.0 and IEEE 802.11u standards.

As the WLAN network spectrum is unlicensed, anyone may operate a WLAN access point more or less at any location. Consequently, a WLAN access point may be operated by a network operator not having licenced spectrum resp. frequency resources available in a particular country. This network operator could thereby provide access to selected services in the home PLMN (HPLMN), e.g. in the IMS, or generally to the Internet. For example an American operator may operate WLAN access points in Germany, and by this enabling that the subscribers of this American operator roaming in Germany can access their home communication network in USA, resp. certain services offered therein, via a WLAN access point in Germany.

In such a case, certain carrier-grade features, for example lawful interception, can be provided by the operator of the WLAN access point on IP level. However, when the mobile terminal of the subscriber uses carrier grade IMS voice service, the lawful interception may no longer be successful as encrypted signalling, for example SIP signalling, would be sent between the mobile terminal and operator network nodes located in the home country (e.g. USA). Further, if media plane security is used, the encrypted voice media would be sent between the mobile terminal and operator network nodes located in the home country. Thus, authorities in the country or area of the WLAN access would be unable to execute lawful interception of the carrier grade IMS voice calls of the mobile terminal.

SUMMARY

The aim of the present invention is thus to provide a method and devices to overcome the above shortcomings.

Therefore, it is provided a method for selecting a communication network for a mobile terminal accessing the communication network via an unlicensed wireless access network, wherein the communication network is selected such that it fulfils carrier grade requirements.

There is further provided a mobile terminal, being capable of selecting a communication network when accessing the communication network via an unlicensed wireless access network, further being capable of selecting the communication network such that it fulfils carrier grade requirements.

It is further provided an access node for an unlicensed wireless access network, being capable of providing a list of communication networks that fulfil carrier grade requirements in order to enable a mobile terminal accessing a communication network via an unlicensed wireless access network to select one out of the service provision networks on the list.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein:

FIG. 4 2 shows a message flow between a mobile terminal and a WLAN access point.

DETAILED DESCRIPTION

As already indicated above, under certain circumstances it could be impossible to provide certain services that may be desired by the customer or required by local regulations.

For example, if a mobile terminal has a subscription of a PLMN with 3GPP radio network license in a first country, and is currently located in a second country, follows the existing ETSI TS 124.234 procedures and selects a WLAN access point in the second country, and happens to select a PLMN for the WLAN (out of the PLMNs available on that WLAN access point) such that the PLMN does not have 3GPP radio network license in the second country or any other license in the second country which would enable authorities in the second country to execute lawful interception of the carrier grade IMS voice calls of the UE, then lawful interception of the authorities in the second country cannot be enforced on the signalling and media of the carrier grade IMS voice calls of the UE.

One possible solution would be that the mobile terminal selects the PLMN selected for 3GPP access as the PLMN selected for WLAN. However, this only works if the UE has activated 3GPP access, and if the PLMN selected in 3GPP access is also available on WLAN access.

If a PLMN does not have 3GPP radio network license, but PLMN has another license related to carrier grade IMS voice calls in the country of the WLAN access point (e.g. fixed PSTN), the PLMN cannot be selected by UE in WLAN even though the PLMN would satisfy the local regulations on lawful interception of the carrier grade IMS voice calls and could be used.

In order to address these issues, there is provided a method, a mobile terminal and an access node for an unlicensed wireless access network for selecting a communication network for a mobile terminal accessing the communication network via an unlicensed wireless access network, wherein the communication network is selected such that it fulfils carrier grade requirements. Therein, the communication network may particularly be a mobile communication network.

The mobile terminal may be any type of mobile communication device that is capable of wireless communication with any type of unlicensed wireless access network, and may include mobile phones resp. user equipments, including so-called smartphones, mobile computers like laptops, netbooks, tablet computers, media devices like e-book readers, audio or video players etc.

The term carrier grade requirements is used herein to refer to a set of defined and reliable services and capabilities to be provided by a network operator, for example carrier grade IP Multimedia Subsystem, IMS, voice call requirements. This may for example include availability requirements, for the individual user who wants to access the network under normal conditions as well as particularly under emergency situations in order to provide priority mechanisms for emergency personnel like police, fire brigade etc. but also for other important persons like public officials managing the emergency situation.

Such carrier grade requirements may also be based on regulatory requirements for operating a communication network in a certain area or country and may thus be subject to local legislation. For example, they may comprise lawful interception capabilities, e.g. as defined in 3GPP TS 33.106 V12.0.0 and/or 3GPP TS 33.107 V12.2.0.

The communication network may be a Public Land Mobile Network, PLMN. Further, it may comprise an IP multimedia subsystem, IMS.

The unlicensed wireless access network may be a wireless local area network, WLAN. For example, it may be operating according to the IEEE 802.11 standard or any other similar technology. Of course it is conceivable that other technologies, like Bluetooth or the like, are used. An access node for such unlicensed wireless access network may be any type of wireless router or access point that is capable of providing wireless access to a communication network to mobile terminals.

Figure 1:
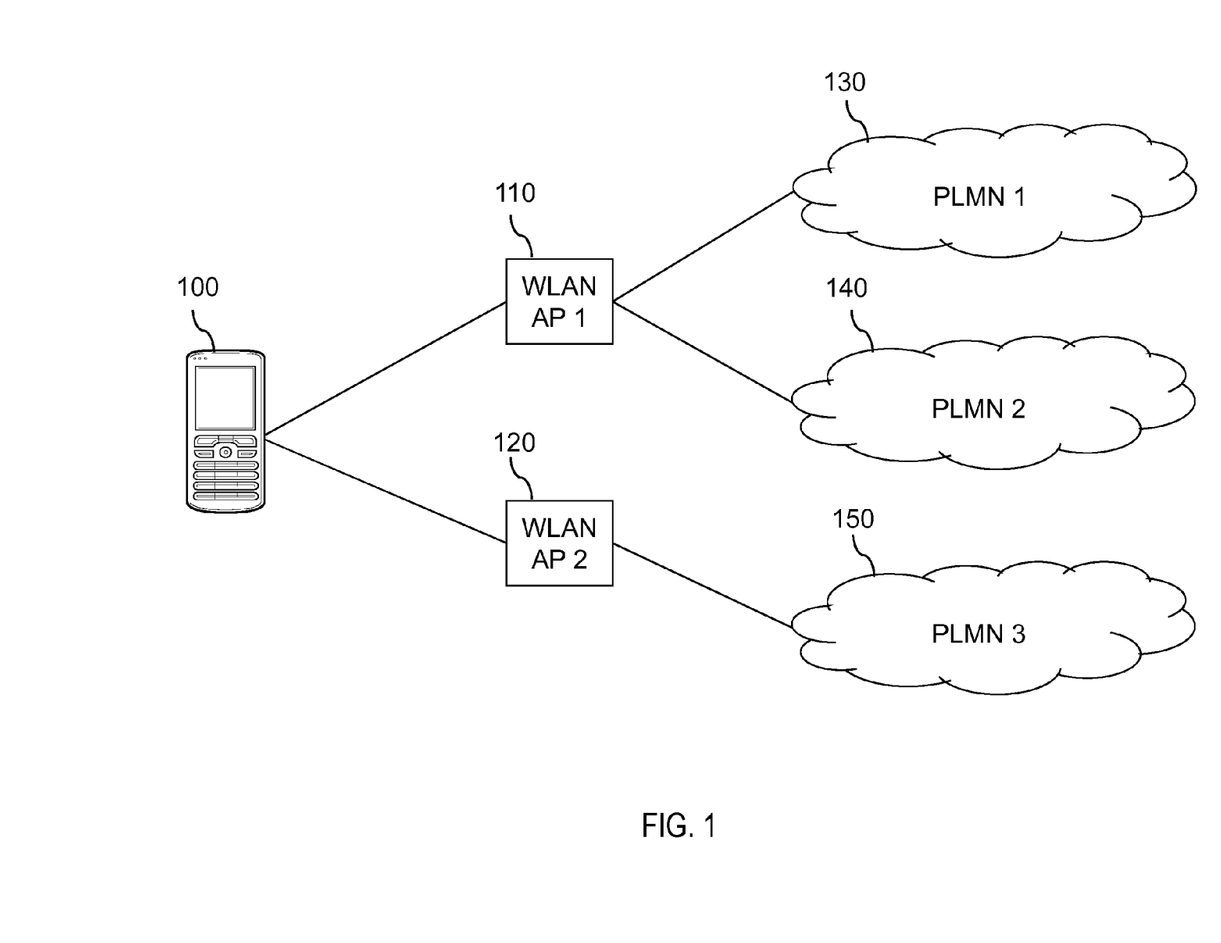
FIG. 1 is an overview of an exemplary network scenario.

FIG. 1 depicts an exemplary network scenario in which the methods and devices described herein can be applied.

A mobile terminal 100 accesses a communication network, and particularly a Public Land Mobile Network, PLMN, to which it has a subscription, via an unlicensed wireless access network.

The unlicensed wireless access network is exemplified by first and second WLAN access points 110 and 120; these may be operating according to the IEEE 802.11 standard or any other similar technology. It may be that these first and second WLAN access points 110 and 120 belong to the same wireless access network, or to different wireless access networks.

In the depicted example, first WLAN access point 110 belongs to a first wireless access network and provides access to first and second PLMNs 130 and 140, while second WLAN access point 120 belongs to a second wireless access network and provides access to third PLMN 150. The first, second and third PLMNs 130, 140 and 150 may be operated by first, second and third network operators, or several of those may be operated by the same network operator.

Mobile terminal 100 may have a subscription with any of the operators of the first, second and third PLMNs 130, 140 and 150, i.e. may have the right to access one or more of these PLMNs based on its subscription.

Under the above-mentioned circumstances, one of the first and second WLAN access points 110, 120 and one of the first, second and third PLMNs 130, 140, 150 need to be selected for the mobile terminal to access the network. In this case, the above described methods for performing this selection may be applied. Particularly, a PLMN is selected such that it fulfils carrier grade requirements, as described above; thereby, in the given scenario, also a WLAN access point is selected.

According to the above method, an access point of the unlicensed wireless access network may provide a list of communication networks that fulfil said carrier grade requirements, whereby the mobile terminal may select one out of the service provision networks on the list.

In a first alternative, the mobile terminal may query a plurality of access points of at least one unlicensed wireless access network for accessible communication networks that fulfil said carrier grade requirements and select an access point, out of the plurality of access points, which provides access to at least one accessible communication network that fulfils said carrier grade requirements.

Figure 2:
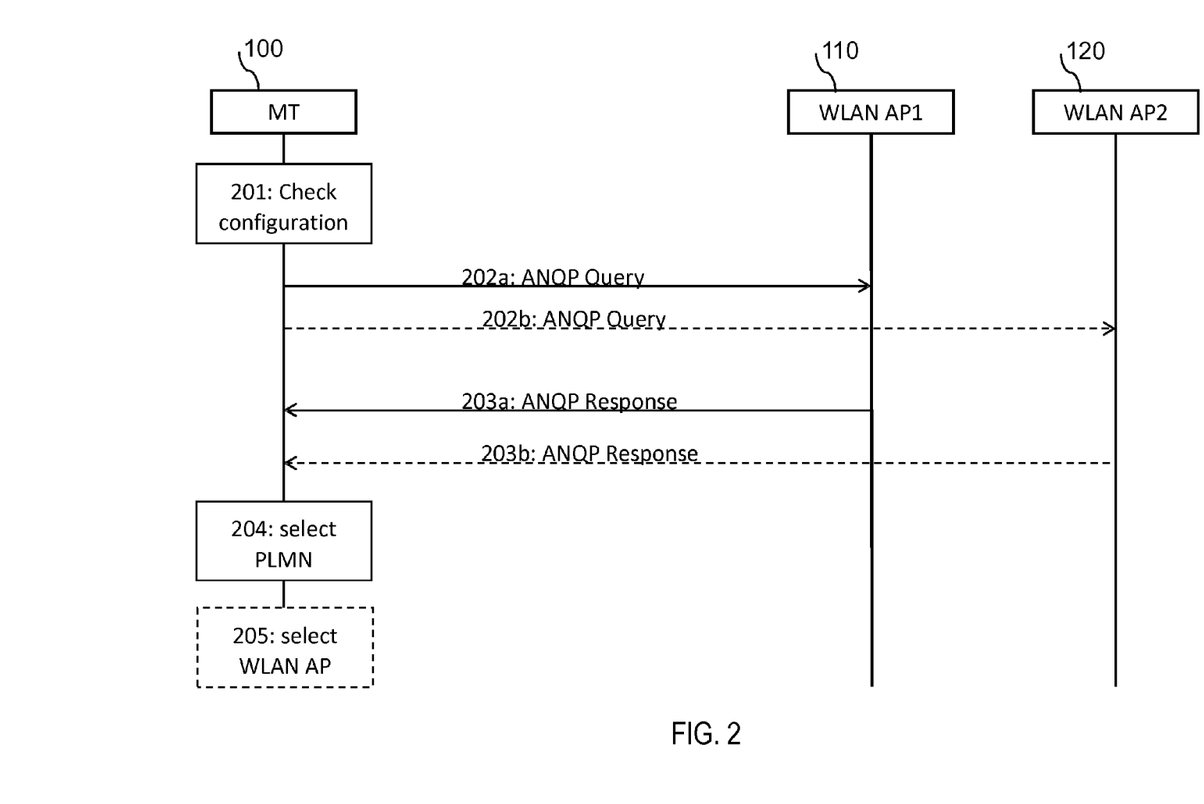
FIG. 2 shows a message flow between a mobile terminal and a WLAN access point.

An example for the first alternative is depicted in FIG. 2 which shows a message flow between a mobile terminal, like mobile terminal 100 of FIG. 1, and access points of an unlicensed wireless access network, e.g. WLAN access points like WLAN access points 110, 120 of FIG. 1.

According to this example, an Access Network Query Protocol, ANQP, parameter called e.g. "PLMNs satisfying the local regulatory requirements on carrier grade IMS voice call regulatory" is defined, and WLAN access points 110, 120 are configured to respond to a mobile terminal's ANQP query of the ANQP parameter "PLMNs satisfying the local regulatory requirements on carrier grade IMS voice call regulatory" with a list of Mobile Country Codes/Mobile Network Codes, MCC/MNC, (or realms) of PLMNs which satisfy the carrier grade IMS voice call regulatory requirements valid in the country where the WLAN access point is located.

Further, a new configuration parameter in the mobile terminal is defined to indicate whether Home Public Land Mobile Network, HPLMN, requires the mobile terminal to "select WLAN access point and PLMN for WLAN so that the carrier grade IMS voice call regulatory requirements valid in the country of the WLAN access point can be satisfied" (or not).

If the configuration parameter in the mobile terminal is set to "select WLAN access point and PLMN for WLAN so that the carrier grade IMS voice call regulatory requirements valid in the country of the WLAN access point can be satisfied" and if the mobile terminal wishes to use WLAN access point for carrier grade IMS voice calls, then the mobile terminal shall:

1) query WLAN access points (possibly all available WLAN access points) for "PLMNs satisfying the local regulatory requirements on carrier grade IMS voice call regulatory";
2) select PLMN for WLAN out of those listed in the discovered ANQP parameter "PLMNs satisfying the local regulatory requirements on carrier grade IMS voice call regulatory" in any WLAN access point;
3) select the WLAN access point where the PLMN selected for WLAN is indicated in the discovered ANQP parameter "PLMNs satisfying the local regulatory requirements on carrier grade IMS voice call regulatory".

In the exemplary message flow of FIG. 2, mobile terminal 100 checks in step 201 whether its configuration parameter is set to "select WLAN access point and PLMN for WLAN so that the carrier grade IMS voice call regulatory requirements valid in the country of the WLAN access point can be satisfied". This is an optional step and may be omitted, e.g. in the case that the mobile terminal is adapted to always select the WLAN access point accordingly. Further, other ways of determining whether selection of a WLAN access point according to carrier grade IMS voice call regulatory requirements is required may be conceived. For example, this can be determined based on location information, e.g. in order to fulfil regulatory requirements in a certain country or area, for example as described in more detail in connection with FIG. 3. As further alternatives, this determination could be made based on information or signalling provided by a WLAN access point or by a Visited Public Land Mobile Network, VPLMN, of the mobile terminal, or based on user interaction.

After this determination, the mobile terminal 100 sends, in step 202a, a query for the above-mentioned ANQP parameter to a first WLAN access point 110, and possibly further such queries to one or more other WLAN access points 120 in step 202b.

Subsequent to the reception of a response from first WLAN access point 110 in step 203a and/or second WLAN access point 120 in step 203b (and possibly further responses from other WLAN access points), mobile terminal 100 selects, in step 204, a PLMN based on the information comprised in the received ANQP parameter(s). Therein, a PLMN is selected which fulfils said carrier grade requirements, for example a PLMN out of those listed in the discovered ANQP parameter(s) "PLMNs satisfying the local regulatory requirements on carrier grade IMS voice call regulatory".

As a further, optional step 205, mobile terminal 100 may select a WLAN access point in the case more than one WLAN access point has been queried in step 202a, 202b. Therein, the WLAN access point is selected which provides access to the PLNM selected in step 204.

It is conceivable that the selection of a WLAN access point according to step 205 and selection of a PLMN in step 204 are performed together. For example, it may be that more than WLAN access point provides access to a PLMN that satisfies the carrier grade requirements; in such a case, a selection of the preferred combination of WLAN access point and PLMN may be made. Criteria for such combined selection may for example be subscription based, e.g. based on the respective operators and whether the user of the mobile terminal has a subscription with any of them or the home operator of the user has a roaming agreement with any of them.

In a second alternative, the mobile terminal may determine location information of an access point of an unlicensed wireless access network, for example a country in which the access point is located, and select a communication network that fulfils said carrier grade requirements based on said location information. Such location information may for example comprise the AP civic location. Further, the mobile terminal may select an access point of an unlicensed wireless access network such that a communication network that fulfils said carrier grade requirements is available at said access point.

Figure 3:
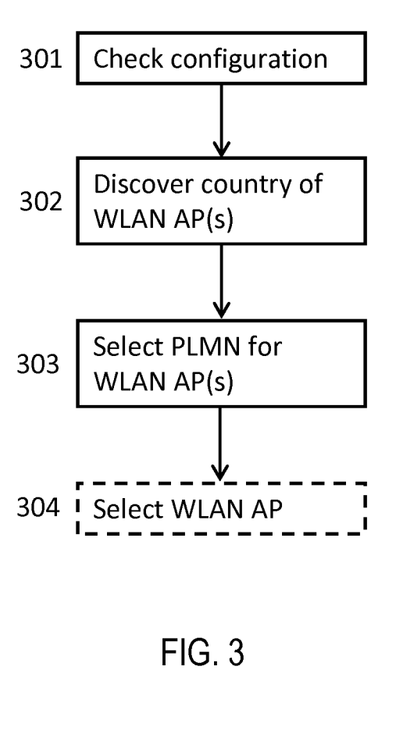
FIG. 3 shows a flowchart of a PLMN selection method in a mobile terminal.

An example for the second alternative is depicted in FIG. 3 which shows a flowchart of a PLMN selection method in a mobile terminal, like mobile terminal 100 of FIG. 1, for selecting a PLMN and potentially an access point of an unlicensed wireless access network, e.g. a WLAN access point like one of WLAN access points 110, 120 of FIG. 1.

Similar to the above example of the first alternative, a configuration parameter, e.g. an ANQP parameter, in the mobile terminal is defined to indicate whether HPLMN requires the mobile terminal to "select WLAN access point and PLMN for WLAN so that the carrier grade IMS voice call regulatory requirements valid in the country of the WLAN access point can be satisfied" (or not).

Again, this can be an explicit configuration parameter, or the requirement whether a WLAN access point needs to be selected such that carrier grade requirements, like the above regulatory requirement, is fulfilled may be determined based on certain criteria like already mentioned above in the first example.

In one example, it can be derived based on location information. Therefore, a configuration parameter in the mobile terminal may be defined to list tuples of <country, MCC/MNC (or realm) of PLMNs satisfying the regulatory requirements on carrier grade IMS voice call in the country>.

If the configuration parameter in the mobile terminal is set to "select WLAN access point and PLMN for WLAN so that the carrier grade IMS voice call regulatory requirements valid in the country of the WLAN access point can be satisfied" and if the UE wishes to use WLAN access point for carrier grade IMS voice calls, then the UE shall:

1) discover the country of the WLAN access point (possibly for each available WLAN access point) e.g. using ANQP parameter "AP Civic Location";
2) select PLMN for WLAN out of those listed as available on the WLAN access point (PLMN available at WLAN access point are discovered e.g. using ANQP parameter "3GPP Cellular Network information", using ANQP parameter "NAI (Network Access Identifier) realm list" or using EAP authentication with alternative NAI), restricted to those listed in tuple of <country, MCC/MNC (or realm) of PLMNs satisfying the regulatory requirements on carrier grade IMS voice call in the country> where country corresponds to the country discovered in the first step; and 3) select the WLAN access point where the PLMN selected for WLAN is available (as discovered using ANQP parameter "3GPP Cellular Network information", using ANQP parameter "NAI realm list" or using EAP authentication with alternative NAI).

In the exemplary method of FIG. 3, mobile terminal 100 checks in step 301 whether its configuration parameter is set to "select WLAN access point and PLMN for WLAN so that the carrier grade IMS voice call regulatory requirements valid in the country of the WLAN access point can be satisfied". This is an optional step and may be omitted, e.g. in the case that the mobile terminal is adapted to always select the WLAN access point accordingly. Further, other ways of determining whether selection of a WLAN access point according to carrier grade IMS voice call regulatory requirements is required may be conceived. If the determination is to be based on location information of a WLAN access point, this determination step 301 may be performed after step 302 described in the following.

Then, the mobile terminal 100 discovers in step 302 the location of an WLAN access point, e.g. the country in which it is located. This may for example be done using ANQP parameter "AP Civic Location". If there are several WLAN access points available, this step may be performed for more than one or even for all available WLAN access points.

In step 303, the mobile terminal selects a PLMN satisfying carrier grade requirements of those available at the WLAN access point(s) addressed in step 302. Therein, the available PLMNs are compared to a list of PLMNs satisfying carrier grade requirements, e.g. to the aforementioned list of tuples of <country, MCC/MNC (or realm) of PLMNs satisfying the regulatory requirements on carrier grade IMS voice call in the country>, wherein country corresponds to the location of the WLAN access point discovered in step 302. As an alternative or addition, in said selection a parameter provided by the WLAN access point(s) that lists PLMNs satisfying carrier grade requirements, like the ANQP parameter "PLMNs satisfying the local regulatory requirements on carrier grade IMS voice call regulatory" described in the first alternative, is evaluated.

As a further, optional step 304, mobile terminal 100 may select a WLAN access point in the case more than one WLAN access point has been addressed in steps 302 and 303. Therein, the WLAN access point is selected which provides access to the PLNM selected in step 303. Again, it is conceivable that the selection of a WLAN access point according to step 304 and selection of a PLMN in step 303 are performed together, just like described above with respect to the first alternative and FIG. 2.

According to a third alternative, a dedicated carrier grade call realm, for example a dedicated carrier grade IMS voice call realm is defined, which can be used when a mobile terminal is to be reachable for the carrier grade IMS voice call. An access point of the unlicensed wireless access network provides information on carrier grade call realms of communication networks supporting said carrier grade requirements. Based on such information received from one or more access points of unlicensed wireless access networks, the mobile terminal may select an access point of an unlicensed wireless access network and a communication network supporting said carrier grade requirements which is available at this access point.

Preferably, these carrier grade IMS voice call realms (e.g. carriergradeIMSvoiceepc.mnc<MNC>.mcc<MCC>.3gppnetwork.org or carriergradeIMSvoice.epc.mnc<MNC>.mcc<MCC>.3gppnetwork.org) would be different from regular realms (e.g. epc.mnc<MNC>.mcc<MCC>.3gppnetwork.org as in 3GPP TS 23.003).

Figure 4:
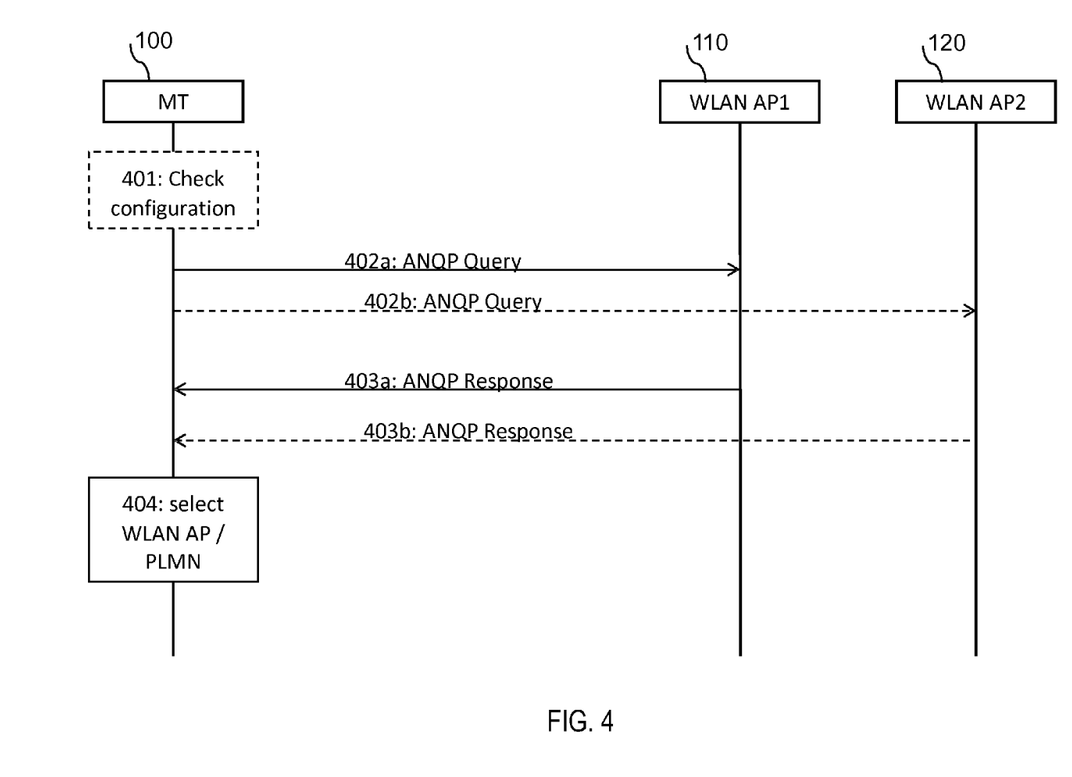

A message flow between a mobile terminal, like mobile terminal 100 of FIG. 1, and access points of an unlicensed wireless access network, e.g. WLAN access points like WLAN access points 110, 120 of FIG. 1, depicting an example for the third alternative is shown in FIG. 4.

Just like in the first and second alternatives, in an optional step 401 the mobile terminal 100 may check whether carrier grade requirements need to be satisfied, e.g. when a configuration parameter is set to "select WLAN access point and PLMN for WLAN so that the carrier grade IMS voice call regulatory requirements valid in the country of the WLAN access point can be satisfied".

Then, in step 402a, an ANQP query for the ANQP parameter "NAI realm list" is sent to first WLAN access point 110, and optionally to further WLAN access points, e.g. to second WLAN access point 120 in step 402b.

The queried first WLAN access point 110 responds, in step 403a, wherein it includes in its response the carrier grade IMS voice call realms of the PLMNs supporting the carrier grade IMS voice call regulatory requirements valid in the country where the WLAN access point is located, and optionally other realms different from the carrier grade IMS voice call realms. The same applies for further queried WLAN access points, e.g. second WLAN access point 120 which responds in step 403b.

It is noted that the ANQP parameter "NAI realm list" does not necessarily include carrier grade IMS voice call realms of the PLMNs not supporting the carrier grade IMS voice call regulatory requirements in the country where the WLAN access point is located. Thus the carrier grade IMS voice call realms included in the response of step 403a may be transmitted separately from the ANQP parameter "NAI realm list", or may be included in this parameter.

In mobile terminals which are to use the carrier grade IMS voice call in WLAN, like mobile terminal 100, HPLMN realm and realms of the preferred roaming partners configured (for selection of PLMN in WLAN) are set only to the carrier grade IMS voice call realms. Thus, in step 404, mobile terminal 100 selects the WLAN access point and/or PLMN in WLAN based on realms indicated in the response of step 403a, 403b, . . . , e.g. by ANQP parameter "NAI realm list" (rather than MCC/MNC in ANQP parameter "3GPP Cellular Network information").

The underlying idea in all alternatives is that only PLMNs who satisfy the local regulatory requirements on carrier grade IMS voice call regulatory can be selected by the mobile terminal, while the basic procedure complies to the one defined in ETSI TS 124.234.

Accordingly, if the mobile terminal is configured to "select WLAN access point and PLMN for WLAN so that the carrier grade IMS voice call regulatory requirements valid in the country of the WLAN access point can be satisfied", lawful interception of voice calls made via WLAN of roaming mobile terminals is satisfied, and the user finds a WLAN when roaming to be reachable via the same MSISDN/SIP address using carrier grade IMS voice call.

Any of the above methods and alternatives may for example be implemented in computer program code, which, when executed by a processor, is configured to carry out or control a method for selecting a communication network for a mobile terminal accessing the communication network via an unlicensed wireless access network as further detailed above and below. To this end, the computer program code may for example be stored in a memory of a mobile terminal and/or an access point and executed by one or more processors of the mobile terminal and/or access point.

Figure 5:
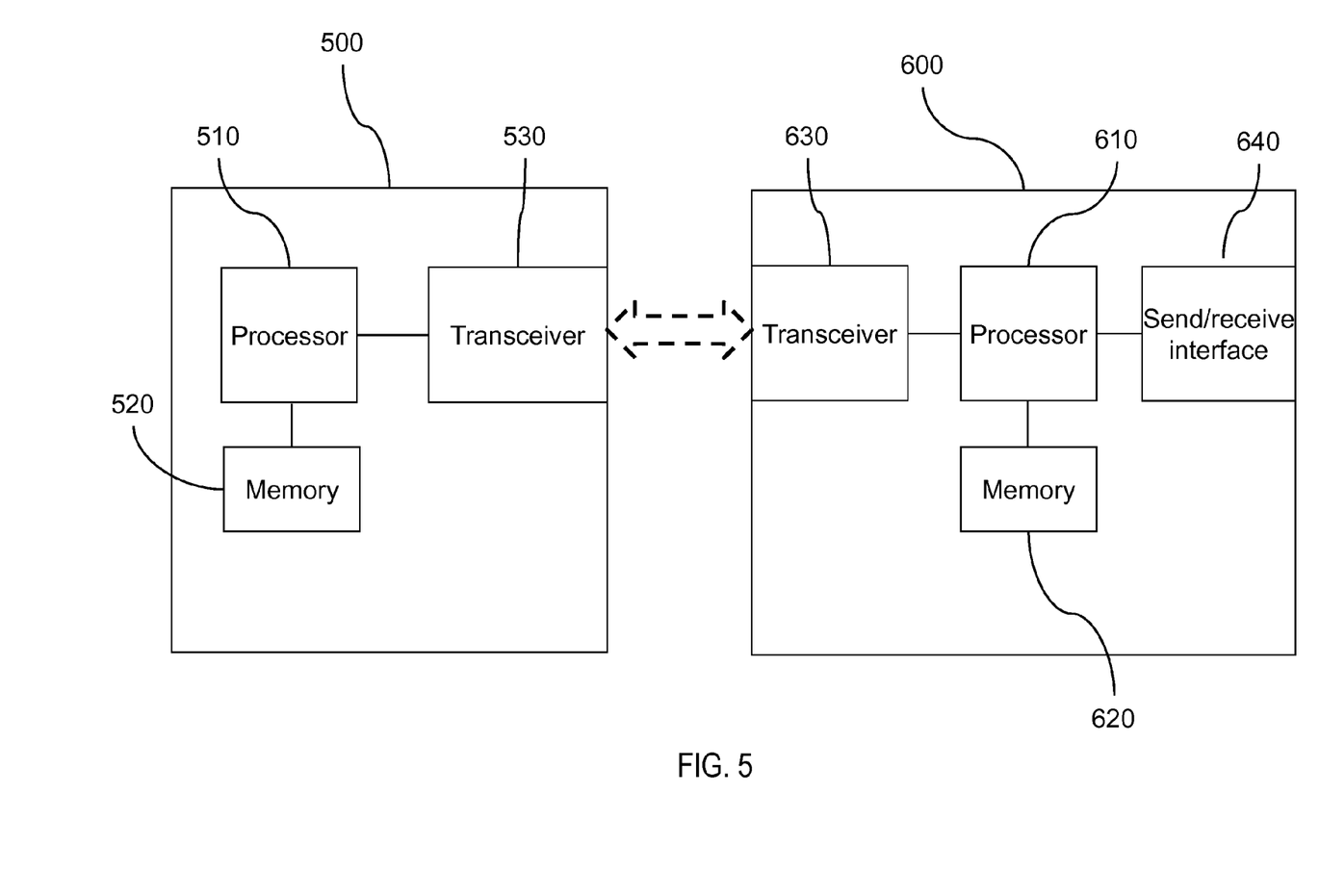
FIG. 5 shows schematic structures of a mobile terminal and an access point.

FIG. 5 depicts exemplary schematic structures of a mobile terminal 500 and an access node 600 being in radio communication with each other.

Mobile terminal 500 may be any type of mobile terminal as mentioned above and may correspond to mobile terminal 100 as described with respect to FIGS. 1 to 4. Mobile terminal 500 comprises a transceiver 530 being adapted for radio communication using unlicensed frequency resources, for example according to any type of WLAN communication, e.g. according to IEEE 802.11.

Mobile terminal 500 further comprises at least one processor 510 controlling operation of mobile terminal 500, e.g. communication with other entities or processing of information, particularly information that has been received from other entities or is to be sent to other entities. Such information, as well as program code to be executed by processor 510 when performing said controlling is stored in memory 520.

Further elements that may or may not be present in mobile terminal 500 have been omitted for sake of clarity, e.g. a transceiver capable of communicating according to a 3GPP standard, a display and the like.

Access node 600 may be any type of access point capable of providing network functionality in using unlicensed frequency resources, for example according to any type of WLAN communication, e.g. according to IEEE 802.11. Thus, access node 600 may correspond to any of the access nodes or access points mentioned above, for example the first and second WLAN access points 110 and 120 of FIGS. 1 to 4. In order to achieve this function, access node 600 comprises a transceiver 630 being adapted for radio communication using unlicensed frequency resources, for example according to any type of WLAN communication, e.g. according to IEEE 802.11.

Access node 600 further comprises at least one processor 610 controlling operation of mobile terminal 500, e.g. communication with other entities or processing of information, particularly information that has been received from other entities or is to be sent to other entities. Such information, as well as program code to be executed by processor 610 when performing said controlling is stored in memory 620.

Further, access node 600 comprises a send/receive interface 640 capable of communicating with a communication network, for example with a PLMN like the first, second and third PLMNs of FIG. 1, or with any type of network like a DSL network and/or the Internet.

For both mobile terminal 500 and access node 600, processor 510 resp. 610 may be or comprise any type of multi-purpose or dedicated processor, or a plurality of such processors. Just as well, memory 520 resp. 620 may be any type of volatile or non-volatile storage, e.g. semiconductor storage like RAM, ROM, Flash memory, solid state disk (SSD) or the like, magnetic storage like hard disk etc.

Mobile terminal 500 and access node 600 may communicate over a wireless interface, e.g. according to IEEE 802.11, as indicated by dashed double-arrow in FIG. 5, to exchange information according to the above-described methods. Thus, mobile terminal 500 and access node 600 may be adapted to perform the methods as described above, e.g. with respect to FIGS. 2 to 4.

For example, computer program code may be stored in memory 520 resp. 620, which, when executed by processor 510 resp. 610 causes the processor to perform the above-described methods.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method of operating a mobile terminal, the method comprising:
    receiving, from at least one first access point of an unlicensed wireless access network, a list of communication networks that fulfill carrier grade requirements comprising regulatory requirements in a country or area corresponding to location of an access point used to access a communication network selected from the list of communication networks; and
    selecting, by the mobile terminal, one of the communication networks that is on the list for the mobile terminal to access, via the unlicensed wireless access network, and an access point for the mobile terminal to access the selected one of the communication networks.

2. The method of claim 1, wherein the carrier grade requirements are carrier grade IP Multimedia Subsystem, IMS, voice call requirements.

3. The method of claim 1, wherein said carrier grade requirements comprise lawful interception capabilities.

4. The method of claim 1, wherein the one of the communication networks is a Public Land Mobile Network, PLMN.

5. The method of claim 1, wherein the unlicensed wireless access network is a wireless local area network, WLAN.

6. The method of claim 1, further comprising querying, by the mobile terminal, a plurality of access points of at least one unlicensed wireless access network for accessible communication networks that fulfill said carrier grade requirements, and selecting an access point, out of the plurality of access points, which provides access to at least one accessible communication network that fulfills said carrier grade requirements.

7. The method of claim 1, further comprising determining location information of the access point of the unlicensed wireless access network and selecting a communication network that fulfills said carrier grade requirements based on said location information.

8. The method of claim 7, further comprising selecting the access point of the unlicensed wireless access network such that a communication network that fulfills said carrier grade requirements is available at said access point.

9. The method of claim 1, further comprising defining a dedicated carrier grade call realm and providing, by the access point of the unlicensed wireless access network, information on carrier grade call realms of communication networks supporting said carrier grade requirements.

10. The method of claim 9, further comprising selecting, by the mobile terminal, an access point of an unlicensed wireless access network and a communication network based on information on carrier grade call realms of communication networks supporting said carrier grade requirements received from one or more access points of unlicensed wireless access networks.

11. The method of claim 1, further comprising:
  determining whether the carrier grade requirements need to be used when an access point and a communication network are selected; and
  transmitting a request to the at least one first access point of the unlicensed wireless network for identification of communication networks that fulfill the carrier grade requirements.

12. A mobile terminal, comprising a processor that is configured to:
  receive, from at least one first access point of an unlicensed wireless access network, a list of communication networks that fulfill carrier grade requirements comprising regulatory requirements in a country or area corresponding to a location of an access point used to access a communication network selected from the list of communication networks;
  select a communication network from the list and an access point for the mobile terminal to access the selected communication network; and
  access the communication network via the selected access point of the unlicensed wireless access network.

13. The mobile terminal of claim 12, wherein the carrier grade requirements are carrier grade IP Multimedia Subsystem, IMS, voice call requirements.

14. The mobile terminal of claim 12, wherein said carrier grade requirements comprise lawful interception capabilities.

15. The mobile terminal of claim 12, wherein the communication network is a Public Land Mobile Network, PLMN.

16. The mobile terminal of claim 12, wherein the unlicensed wireless access network is a wireless local area network, WLAN.

17. The mobile terminal of claim 12, the mobile terminal is further configured to query a plurality of access points of at least one unlicensed wireless access network for accessible communication networks that fulfill said carrier grade requirements, and select an access point, out of the plurality of access points, which provides access to at least one accessible communication network that fulfills said carrier grade requirements.

18. The mobile terminal of claim 12, the mobile terminal is further configured to determine location information of an access point of an unlicensed wireless access network and select a communication network that fulfills said carrier grade requirements based on said location information.

19. The mobile terminal of claim 18, further configured to select an access point of an unlicensed wireless access network such that a communication network that fulfills said carrier grade requirements is available at said access point.

20. An access node for an unlicensed wireless access network, the access node comprising a processor that is configured to provide a list of communication networks that fulfill carrier grade requirements comprising regulatory requirements in a country or area corresponding to a location of an access point used to access a communication network selected from the list of communication networks in order to enable a mobile terminal accessing a communication network via an unlicensed wireless access network to select one of the service provision networks on the list and an access point for the mobile terminal to connect to the selected one of the service provision networks.

21. The access node of claim 20 wherein the carrier grade requirements are carrier grade IP Multimedia Subsystem, IMS, voice call requirements.

22. The access node of claim 20, wherein said carrier grade requirements comprise lawful interception capabilities.

23. The access node of claim 22, wherein the communication network is a Public Land Mobile Network, PLMN.

24. The access node of claim 20, wherein the unlicensed wireless access network is a wireless local area network, WLAN.

25. The access node of claim 20, configured to provide information on carrier grade call realms of communication networks supporting said carrier grade requirements.

26. A computer program product comprising a non-transitory computer readable storage medium storing program code, which, when executed by a processor, is configured to carry out or control a method for selecting a communication network for a mobile terminal accessing the communication network via an unlicensed wireless access network, the method comprising:
  receiving, from at least one first access point of an unlicensed wireless access network, a list of communication networks that fulfill carrier grade requirements comprising regulatory requirements in a country or area corresponding to a location of an access point used to access a communication network selected from the list of communication networks; and
  selecting a communication network for the mobile terminal from the list to access the communication network via an unlicensed wireless access network and an access point for the mobile terminal to access the selected one of the communication networks.

* * * * *